Jan. 4, 1949.   F. E. HUMMEL   2,457,898
AUXILIARY HANDLE
Filed Sept. 25, 1944
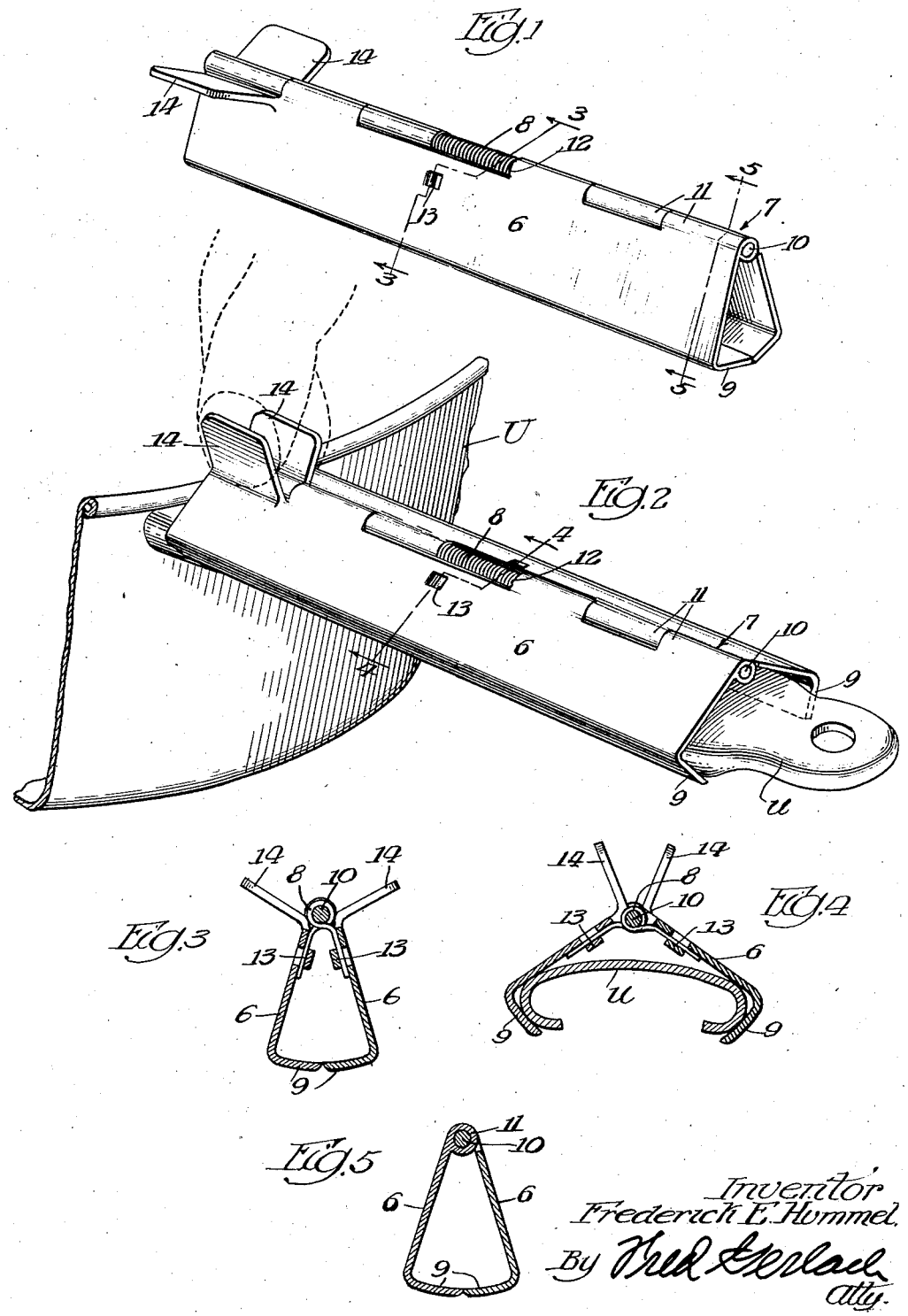
Inventor
Frederich E. Hummel,
By Fred Gerlach
Atty.

Patented Jan. 4, 1949

2,457,898

UNITED STATES PATENT OFFICE 2,457,898

AUXILIARY HANDLE

Frederick E. Hummel, Chicago, Ill.

Application September 25, 1944, Serial No. 555,653

2 Claims. (Cl. 16—114)

The present invention relates generally to auxiliary handles. More particularly the invention relates to that type of auxiliary handle which is especially designed to extend around and grip the outwardly projecting side handle of a pot variety cooking utensil when it is desired to move the utensil from place to place and the utensil is in such a heated condition that the handle thereof cannot be comfortably gripped by the hand, and serves when in its operative position, i. e., in gripping relation with the handle of the utensil, as a heat insulator for the hand and also to facilitate gripping and subsequent manipulation of the utensil.

As evidenced by United States Patent No. 2,250,709, granted to me on July 29, 1941, it has heretofore been proposed in connection with an auxiliary handle of the aforementioned type to utilize a pair of complemental oppositely positioned elongated side pieces which are downwardly divergent, have inturned flanges in the bottom margins thereof for underlying the side margins of the cooking utensil handle, and are connected together at the top margins thereof by an integral, full length three-quarter round loop in order that in connection with gripping thereof they may be swung inwards into clamped or gripping relation with the side margins of the utensil handle. In practice it has been found that an auxiliary handle of the last mentioned character, although it effectively and efficiently fulfills its intended purpose, is subject to certain objections. In the first place it is necessary to slide the auxiliary handle longitudinally onto the utensil handle and this is sometimes difficult or inconvenient because it entails truly aligning the outer end of the utensil handle with the front end of the auxiliary handle. Secondly, the user of the auxiliary handle must, in connection with use thereof, constantly urge the side pieces inwards into gripping relation with the side margins of the utensil handle. Thirdly, when the auxiliary handle is released after it has been used to move the utensil from one place to another it is loose so far as the utensil handle is concerned and hence is likely to slip or become displaced from the utensil handle.

The primary object of the invention is to provide an auxiliary handle of the type under consideration which is an improvement upon, and eliminates the defections of, previously designed auxiliary handles, including primarily that forming the subject matter of the aforementioned patent. In general the improved auxiliary handle comprises in addition to the complemental oppositely positioned elongated downwardly divergent side pieces with inturned flanges along their bottom margins, a loose pivotal connection between the top margins of the side pieces together with spring means for urging the side pieces into gripping relation with the handle of the utensil to which the auxiliary handle is applied. By employing spring means for urging the flange equipped side pieces inwards, i. e., towards one another, the user of the auxiliary handle is not constrained to exercise constant inward pressure on the side pieces in connection with use of the auxiliary handle and the auxiliary handle will remain in associated relation with the utensil handle after it is released by the user.

Another object of the invention is the provision in connection with the improved auxiliary handle, of a pair of upwardly divergent ears which are connected to the front ends of the side pieces, respectively, and are adapted when pressed together to swing the side pieces outwards against the force of the spring means into an open position wherein they may be readily applied to the utensil handle merely by shifting them downwards into engagement with the utensil handle.

A further object of the invention is to provide an auxiliary handle of the type and character under consideration which is generally of new and improved construction and is characterized by the fact that it is light in weight and may be manipulated with facility as well as produced at a low and reasonable cost.

Other objects of the invention and the various advantages and characteristics of the present auxiliary handle will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like letters and numerals of reference denote corresponding parts throughout the several views:

Figure 1 is a perspective of an auxiliary handle embodying the invention;

Figure 2 is a perspective showing the handle in its operative position with respect to the handle of a pot variety cooking utensil;

Figure 3 is a vertical transverse section on the line 3—3 of Figure 1;

Figure 4 is a vertical transverse section taken on the line 4—4 of Figure 2, and illustrating the manner in which the spring means serves to urge the complemental side pieces inwards into gripping or clamped relation with the side margins of the utensil handle; and Figure 5 is a section on the line 5—5 of Figure 1.

The auxiliary handle which is shown in the drawing constitutes the preferred form or embodiment of the invention. It is illustrated in connection with a cooking utensil U and as its main or principal parts comprises a pair of complemental oppositely positioned side pieces 6, a hinge connection 7 between the top margins of the side pieces, and a spring 8 for urging the side pieces toward one another. The utensil U is in the nature of a standard pot and embodies a handle u whereby it may be normally gripped when it is desired to move it from place to place. The handle u is suitably connected to the top margin of the side wall of the utensil and projects outwards and slightly upwards therefrom. It it illustrated as being formed of a metal stamping and has the side margins thereof bent downwards and inwards as is conventional in the art.

The side pieces 6 are complemental and the same in length and height. They are downwardly divergent and coact, as hereafter described, to form a gripping medium for the utensil handle u as well as a heat insulator between the user's hand and the handle of the utensil U especially when the utensil U is in a heated condition and it is impossible or impractical to grip the handle u in connection with the utensil U being moved from place to place. Preferably the side pieces 6 are formed of molded "plastic" type material having low heat conductivity, although, if desired, the side pieces may be formed of sheet metal stampings. As shown in the drawing, the side pieces 6 are substantially as long as the utensil handle u. The bottom margins of the side pieces 6 are provided with integral, full length inwardly extending flanges 9 and these are adapted to underlie the side margins of the utensil handle u when the auxiliary handle is in its operative position and extend at substantially right angles to the side pieces. Said side pieces, due to the hinge connection 7 at their upper margins, are permitted to swing freely to and from one another and, as hereafter described, are urged towards one another by the spring 8. In applying the auxiliary handle to the utensil handle u the side pieces are swung outwards so that the inturned flanges 9 along the bottom margins thereof are disposed a sufficient distance apart to receive the side margins of the utensil handle. Thereafter the auxiliary handle is shifted downwards into freely gripping relation with the utensil handle and then released. In connection with release of the auxiliary handle the spring 8 urges the side pieces 6 inwards into a position wherein the inturned flanges 9 are in underlying and gripping relation with the side margins of the utensil handle.

The hinge connection 7 comprises a pivot pin 10 and in addition a longitudinal series of aligned tubular parts 11 which are formed on, and integrally with, the top margins of the two complemental side pieces 6. Every other tubular part 11 is formed on the top margin of one of the side pieces 6 and the alternate tubular parts are formed on the top margin of the other side piece. As best shown in Figures 1 and 2 each of the tubular parts 11 has at least one end thereof in abutment with the adjoining tubular parts. The two innermost tubular parts are spaced longitudinally apart to provide a space 12 therebetween. Preferably one of the side pieces 6 has two spaced apart tubular parts 11 at its rear end and a single tubular part at its front end and the other side piece has two spaced apart tubular parts at its front end and a single tubular part at its rear end. By so arranging the tubular parts the side pieces are truly complemental and hence may be formed in a single mold. The pivot pin 10 corresponds in length to the side pieces 6 and extends through the tubular parts 11. The ends of the pin are beaded or riveted over in order to prevent longitudinal displacement of the pin relatively to the side pieces. The pin 10 and tubular parts 11, because of their construction and design, form a free or loose hinge connection between the two side pieces 6.

The spring 8 constituting the spring means for urging the side pieces 6 towards one another into gripping or clamped relation with the side margins of the utensil handle u is formed of spirally wound wire and extends around the central portion of the pivot pin 10. It is located in the space 12 between the innermost tubular parts 11 and has its ends fitting within and anchored to integral instruck or inwardly extending clip-like elements 13 on the central portions of the side pieces 6. Preferably the spring is so loaded that serves to urge the side pieces 6 inwards with pronounced pressure. When the auxiliary handle is released while it is not in use the spring 8, as shown in Figures 3 and 5, swings the side pieces 6 inwards into a position wherein the free side edges of the flanges 9 are in abutment with one another.

In order to facilitate swinging apart of the side pieces 6 in application of the auxiliary handle to the utensil handle the front upper corners of the side pieces are provided with a pair of upwardly divergent ears 14. These ears are preferably formed integrally with the side pieces and are adapted in connection with application of the auxiliary handle to the utensil handle to be gripped between the user's thumb and first finger and pressed inwards. In connection with inward pressing or swinging of the ears 14 the side pieces 6 are swung apart into an open position wherein they are in readiness in connection with downward shift of the auxiliary handle to be applied to the side margins of the utensil handle u. When the auxiliary handle is released while it is not in use the ears 14 are, as shown in Figure 3, positioned at an angle of approximately 135°.

When it is desired to use the auxiliary handle the user grasps the side pieces in one hand and then by way of his or her thumb and first finger presses the ears 14 together. Such pressing upon the part of the ears operates, as hereinbefore described, to swing the side pieces 6 into an open position. After opening of the side pieces the handle is lowered onto the auxiliary handle and then released so that the spring 8 operates to swing the side pieces into a position wherein the inwardly extending flanges 9 thereof are in underlying and gripping relation with the side margins of the utensil handle. After the auxiliary handle is applied to the utensil handle it may be used to move the utensil U from one place to another and serves as a heat insulator between the user's hand and the utensil handle. When it is desired to remove the auxiliary handle it is only necessary to press inwards on the upwardly divergent ears 14 in order to swing apart the side pieces and release them from the utensil handle.

The herein described auxiliary handle effectively and efficiently fulfills its intended purpose and is so designed and constructed that it may be produced at an extremely low cost. It may be applied with facility and when in its operative position remains in place due to the action of the spring 8. Durability and practicability are both attributes of the improved auxiliary handle. Another attribute of the handle resides in the fact that the handle, due to its particular design or construction, may be applied to utensil handles of different sizes and shapes.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, an auxiliary handle adapted for use in connection with a utensil having an outwardly projecting handle, and comprising a pair of complemental oppositely positioned downwardly divergent rigid one-piece side pieces having at the bottom margins thereof inturned flanges for gripping the utensil handle and embodying at their top margins a longitudinal series of alternately arranged tubular parts, certain adjoining parts of said series being spaced apart so as to provide therebetween an elongated opening, a pivot pin extending through said tubular parts and forming therewith a hinge connection for permitting the side pieces to swing freely to and from one another, and a spiral spring disposed in said opening, extending around the pivot pin, having the ends thereof connected directly to the side pieces, and arranged and loaded so that it urges said side pieces inwards in order to bring the inturned flanges into gripping relation with the side margins of the utensil handle.

2. As a new article of manufacture, an auxiliary handle adapted for use in connection with a utensil having an outwardly projecting handle, and comprising a pair of complemental oppositely positioned downwardly divergent rigid one-piece side pieces having at the bottom margins thereof inturned flanges for gripping the utensil handle and embodying at their top margins a longitudinal series of alternatively arranged tubular parts, certain adjoining parts of said series being spaced apart so as to provide therebetween an elongated opening, a pivot pin extending through said tubular parts and forming therewith a hinge connection for permitting the side pieces to swing freely to and from one another, a spiral spring disposed in said opening, extending around the pivot pin, having the ends thereof fitting against the inner faces of, and connected directly to, the side pieces, and arranged and loaded so that it urges said side pieces inwards in order to bring the inturned flanges into gripping relation with the side margins of the utensil handle, and a pair of upwardly extending ears connected to the top margins of the side pieces, respectively and adapted when pressed towards one another to swing the side pieces outwards against the force of said spring into an open or utensil handle releasing position.

FREDERICK E. HUMMEL.

REFERENCES CITED

The following references are of record in the file of this patent:

UNITED STATES PATENTS

| Number | Name | Date |
|---|---|---|
| 197,173 | Reinhard | Nov. 13, 1877 |
| 1,162,896 | Achberger | Dec. 7, 1915 |
| 1,263,508 | Zeckser | Apr. 23, 1918 |
| 2,250,709 | Hummel | July 29, 1941 |